United States Patent [19]
Chamberlain

[11] Patent Number: 5,788,564
[45] Date of Patent: Aug. 4, 1998

[54] TUNNEL CARBON DIOXIDE IMMOBILIZER

[75] Inventor: George Chamberlain, Campbellville, Canada

[73] Assignee: Maple Leaf Pork, A Division of Maple Leaf Meats, Burlington, Canada

[21] Appl. No.: 731,929

[22] Filed: Oct. 16, 1996

[51] Int. Cl.$^6$ ............................................. A22B 3/00
[52] U.S. Cl. ................................................. 452/66
[58] Field of Search ............................... 452/66, 57

[56] References Cited

U.S. PATENT DOCUMENTS

| | | |
|---|---|---|
| 2,526,037 | 10/1950 | Murphy . |
| 2,733,477 | 2/1956 | Murphy . |
| 4,571,777 | 2/1986 | Nijhuis . |
| 4,888,855 | 12/1989 | Haumann et al. ................. 452/66 |
| 5,186,677 | 2/1993 | Christensen . |
| 5,487,699 | 1/1996 | Tyrrell . |

Primary Examiner—Willis Little
Attorney, Agent, or Firm—Ridout & Maybee

[57] ABSTRACT

An apparatus for anesthetizing animals for slaughter has a gas chamber with an inlet at one end and an outlet at another end, and an inclined inlet ramp extending to the inlet of the chamber and a declined outlet chute for receiving anesthetized animals from the outlet of the chamber. The inlet ramp is sized to force the animals to proceed to the inlet in single file. A continuous belly conveyor extends through the gas chamber from the inlet, through an anesthetizing gas zone, and through the outlet for supporting the animals on their bellies and transporting them through the gas chamber in single file at a rate sufficiently slow to ensure each animal is rendered unconscious by the time it reaches the outlet. The conveyor has a pickup portion extending from the inlet of the chamber into the inlet ramp for receiving individual animals and supporting them on their bellies for introduction into the chamber.

15 Claims, 1 Drawing Sheet

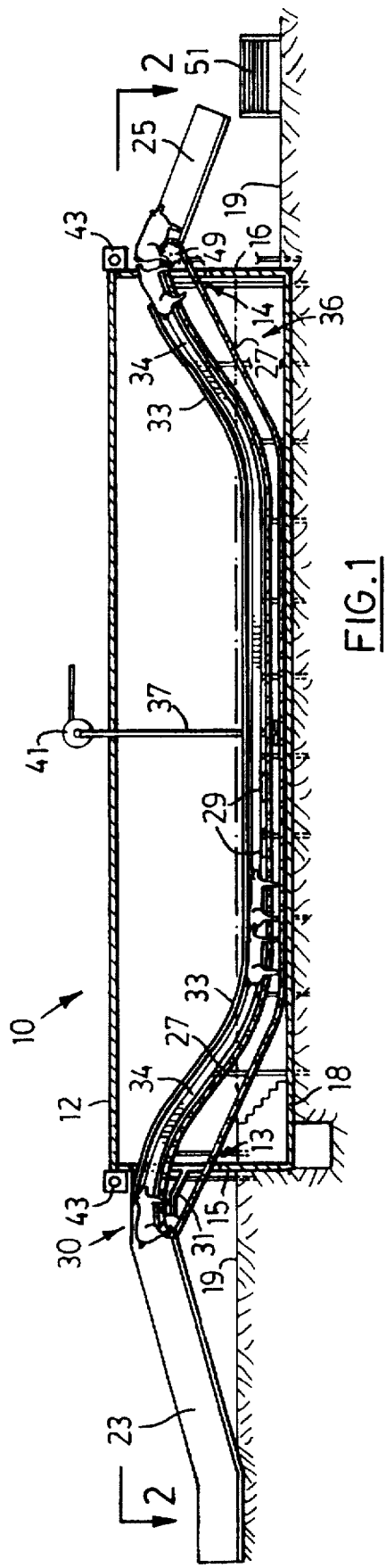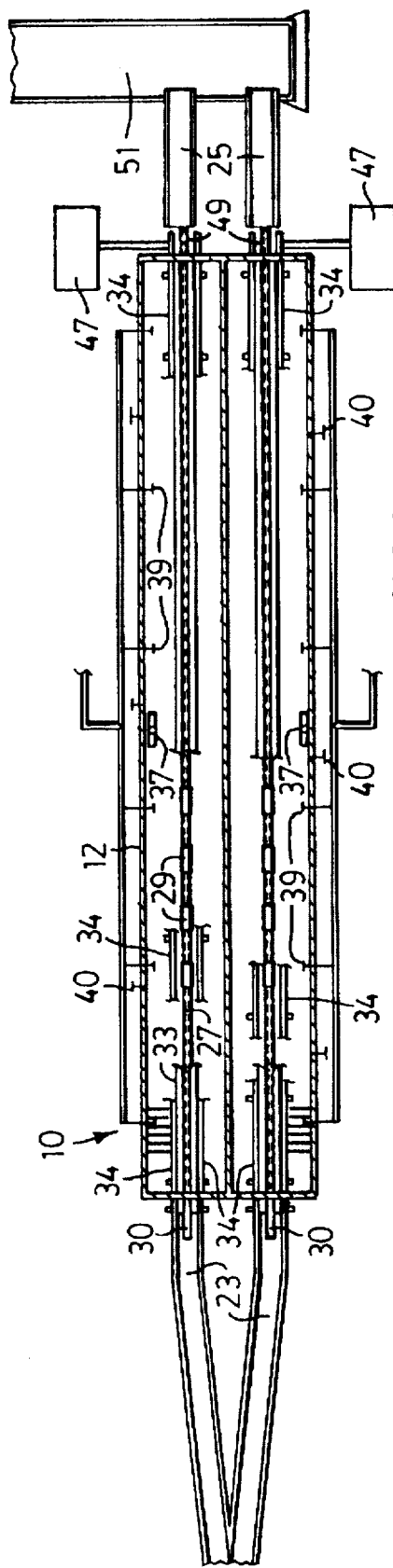

5,788,564

TUNNEL CARBON DIOXIDE IMMOBILIZER

BACKGROUND OF THE INVENTION

The invention is an apparatus for anesthetizing animals for slaughter. The invention utilizes a gas chamber to immobilize slaughter animals and provides a number of advantages over prior art devices. The invention is particularly useful for immobilizing four legged animals like pigs and sheep.

For the purpose of this disclosure, the invention will be described as it applies to the slaughter of pigs. The skilled person will appreciate, however, that the invention may be adapted for use in the slaughter of a variety of animals.

Existing devices for immobilizing animals preparatory to slaughter have a number of drawbacks. Electrocution devices and gas chamber devices are commonly used in slaughterhouses to immobilize pigs for slaughter. The electrocution devices stun the pigs unconscious while the gas chamber devices anesthetize the pigs unconscious. It is generally thought that meat resulting from gas anesthetization is superior in quality to that resulting from electrical immobilization. Also, gas anesthetization does not produce convulsing animals as is frequently the case with electrocution.

After immobilization, the pigs are preferably suspended by their hind legs and bled to death. The vertical bleeding of the animals minimizes blood clots, which are undesirable. Existing gas anesthetizing devices typically operate on a carousel arrangement whereby a plurality of cages each containing two or three pigs are lowered into an immobilizing gas, such as carbon dioxide. These devices present unconscious pigs to the bleeder in a random orientation, often comprising a tangled pile of animals. Accordingly, further processing of the pigs after immobilization requires the efforts of at least two people to orient the animals for shackling. An equipment breakdown usually causes the death of animals in the gas chamber portion of the device which results in those carcasses being condemned.

Electrocution devices employ a V-style restrainer conveyor to transport pigs individually to usually two electrodes which contact the pigs' heads providing a stunning electric shock. While the animals exit the device to the bleed table spaced and aligned, electrocution renders the animals prone to convulsions which hampers the shackling step.

Neither type of existing immobilizer enables a capacity for processing more than about 750 pigs per hour. Both existing devices require a fairly high level of ongoing maintenance and, in the case of the gas anesthetizing device, a complete annual overhaul is mandatory.

SUMMARY OF THE INVENTION

The invention addresses the shortcomings of prior art devices by providing a belly style conveyor for moving the animals individually through a gas chamber, rather than grouped in cages, and then depositing the anesthetized animals sequentially and correctly oriented onto a bleed table. The invention allows for the processing of about 1000 pigs per hour using two conveyors running side-by-side with fewer personnel than is required by existing devices. The gas chamber of the invention is equipped with means for introducing an anesthetizing gas, such as carbon dioxide, and means for rapid exhaust of the anesthetizing gas from the chamber in the case of a breakdown of the conveyor. This feature greatly reduces or eliminates the loss of animals in the event of an equipment failure.

Accordingly, the invention provides an apparatus for anesthetizing animals for slaughter, comprising a gas chamber having an inlet at one end and an outlet at another end. The chamber is sized to provide an anesthetizing gas zone in a lower portion thereof so that animals may be rendered unconscious during their traverse of the zone.

An inclined inlet ramp extends to the inlet of the chamber and a declined outlet chute receives animals from the outlet of the chamber. The inlet ramp is sized to force the animals to proceed to the inlet in single file. A continuous belly conveyor extends through the gas chamber from the inlet to the outlet for supporting the animals on their bellies and transporting them through the gas chamber in single file at a rate sufficiently slow to ensure each animal is rendered unconscious by the time it reaches the outlet. The conveyor has a pickup portion extending from the inlet of the chamber into the inlet ramp for receiving individual animals and supporting them on their bellies for introduction into the chamber.

The chamber has means for introducing an anesthetizing gas into the chamber, and preferably means for rapidly exhausting the anesthetizing gas from the chamber to prevent unwanted suffocation of animals in the event of a breakdown of the conveyor.

BRIEF DESCRIPTION OF THE DRAWINGS

FIG. 1 is a side cross section of a preferred embodiment of the invention showing a single chamber and conveyor.

FIG. 2 is a plan view of the invention with two chambers positioned side-by-side supplying immobilized animals to a single bleed table.

As shown, the invention comprises a gas chamber 10 which preferably is rectangular with dimensions of approximately 60 feet (18.2 m) by 11.5 feet (3.5 m) by 5.5 feet (1.7 m). The chamber 10 has a top 12 and has an inlet 13 and an outlet 14 at opposite ends 15 and 16. Preferably, the chamber 10 is situated in a pit with its floor 18 about 5 feet (1.5 m) below floor level 19 of the building. Preferably, the top 12 is retractable to facilitate maintenance or the removal of trapped animals.

An inclined inlet ramp 23 extends to the inlet 13, and a declined outlet chute 25 extends from the outlet 14 of the chamber 10. The inlet ramp 23 is of a width to force the animals to proceed to the inlet 13 in single file. In the case of slaughter pigs weighing 75–120 kg, the width of the ramp 23 is about 15 inches (38 cm). At the top of the inlet ramp 23, the animals are picked up by a continuous conveyor 27 which extends through the gas chamber 10 from the inlet 13 to the outlet 14. In the preferred embodiment, the conveyor 27 is a belly style chain conveyor which is equipped with a plurality of spaced cleats 29 for receiving and frictionally holding each animal on the conveyor 27 during its traverse through the chamber 10. The conveyor 27 has a pickup portion 30 which extends from the chamber inlet 13 into the inlet ramp 23 for picking up individual animals. Preferably, the pickup portion 30 of the conveyor 27 has a slight incline so that the animals are lifted off of their feet when they are engaged by the conveyor 27. Alternatively, or in addition to this slight incline for the pickup portion 30, the inlet ramp 23 may have a declining end portion 31 so that the animal on the conveyor 27 quickly loses foot contact with the ramp 23.

As mentioned, it is preferable to provide the conveyor 27 with a plurality of spaced cleats 29 upon which the animals rest during their traverse of the chamber 10. The cleats 29 are fastened to the conveyor chain 27 and frictionally engage the belly of each animal. The purpose of the cleats 29 is to provide frictional resistance to the sliding movement of animals as they move along the slanted sections of the conveyor 27. Thus, it is preferred that the cleats 29 be made of a material which provides a high coefficient of friction with the belly of the animal. A suitable material for this purpose is rubber.

The invention as configured for immobilization of pigs has a chain for the conveyor 27 which is about 6 inches (15 cm) wide. In order to assure containment of the pigs while they are transported through the chamber 10, the preferred embodiment includes two or more overhead guides 33 which are positioned just above the pigs carried on the conveyor 27. The guides 33 may be steel pipes. Also, containment walls 34 are normally provided along each side of the conveyor 27 to prevent sideways dislocation of animals being carried on the conveyor 27.

The preferred gas for anesthetizing the animals in the chamber 10 is carbon dioxide. This gas is heavier than air, so it readily sinks to the bottom of the chamber 10 where an anesthetizing zone of gas 36 approximately 3 feet (0.92 m) deep can be maintained. The carbon dioxide is preferably introduced into the bottom of the chamber 10 through a plurality of spaced inlet pipes 39. Preferably, a plurality of carbon dioxide sensors 40 are spaced along the chamber 10 to provide a monitoring of the gas concentration in the anesthetizing gas zone 36. The chamber 10 is also provided with means for rapidly exhausting the carbon dioxide from the chamber 10. The preferred gas exhaust means is a blower 41 connected to a pipe 37. As shown in the drawings, an exhaust pipe 37 may extend down along a lateral wall of the chamber 10 approximately midway along its length to near the floor 18 of the chamber 10. In case of a breakdown of the conveyor 27, the blower 41 is activated to quickly vent carbon dioxide to the exterior atmosphere. Carbon dioxide is prevented from flowing out of the chamber 10 through the inlet 13 and the outlet 14 by providing each of these openings with an overhead blower 43 which creates an air curtain at each opening.

The movement of animals through the chamber 10 is governed by a variable speed drive means 47 which is provided to the drive sprocket 49 for the conveyor 27. Assuming that the gas zone 36 has a carbon dioxide concentration of about 90%, pigs can be immobilized upon approximately a 60–90 sec. exposure to the gas. The variable speed drive for the conveyor 27 allows the exposure time for immobilization to be optimized, and where two chambers 10 are being operated in parallel to feed a single bleed table 51, the drive means 47 for each conveyor 27 can be adjusted to ensure an even spacing of animals being delivered to the bleed table 51.

While the chamber 10 may be made of a variety of materials, it is preferred that the chamber 10 be constructed of stainless steel. The chamber 10 is preferably wide enough to allow personnel to enter it for maintenance purposes or to remove animals.

In operation, pigs, for example, are driven up the inclined inlet ramp 23 to the pickup portion 30 of the conveyor 27. Each pig, straddling the conveyor belt 27, is picked up by a cleat 29 on the conveyor 27 and supported on its belly as it is moved through the air curtained inlet 13 of the chamber 10. Each pig on the conveyor 27 is transported directly down into the anesthetizing gas zone 36 of the chamber 10 where it is exposed to the anesthetizing gas, such as carbon dioxide, for a sufficient period to render it immobile, i.e. unconscious, by the time it reaches the outlet 14. The conveyor 27 extends through the air curtained outlet 14 to the chute 25 where each pig is deposited and slides down the chute 25 to the bleed table 51. Because the pigs are deposited on the bleed table 51 in a spaced and correctly oriented fashion, a single worker can shackle each pig as it moves along the table 51 for further processing. By operating two immobilizing devices of the invention in parallel, up to 1000 pigs per hour can be immobilized for slaughter with only one worker being required to shackle the immobilized animals.

I claim:

1. An apparatus for anesthetizing animals for slaughter, comprising:

a gas chamber having a top, side walls and a floor, the chamber having an inlet through one end wall and an outlet through another end wall, the chamber being sized to provide an anesthetizing gas zone in a lower portion thereof so that animals may be rendered unconscious during their traverse of the zone;

an inclined inlet ramp extending to the inlet of the chamber and a declined outlet chute for receiving anesthetized animals from the outlet of the chamber, the inlet ramp being sized to force the animals to proceed to the inlet in single file;

a continuous belly conveyor extending through the gas chamber from the inlet, through the anesthetizing gas zone, and through the outlet for supporting the animals on their bellies and transporting them through the gas chamber in single file at a rate sufficiently slow to ensure each animal is rendered unconscious by the time it reaches the outlet, the conveyor having a pickup portion extending from the inlet of the chamber into the inlet ramp for receiving individual animals and supporting them on their bellies for introduction into the chamber;

guide means extending alone either side and over the conveyor substantially along its entire length, the guide means containing the animals on the conveyor during their transport through the chamber; and means for introducing an anesthetizing gas into the chamber.

2. An apparatus as claimed in claim 1, wherein the inlet and outlet are located in the upper portion of each end of the chamber.

3. An apparatus as claimed in claim 1, wherein the chamber is situated in a pit so that the anesthetizing gas zone is located entirely below floor level of the building.

4. An apparatus as claimed in claim 1, wherein each of the inlet and outlet has means for providing an air curtain at the exterior end walls of the chamber, thereby providing a barrier between the exterior and interior of the chamber.

5. An apparatus as claimed in claim 4, wherein the air curtain is provided by a blower positioned on each exterior end wall of the chamber.

6. An apparatus as claimed in claim 1, wherein the inlet ramp has a declining portion adjacent the inlet to the chamber.

7. An apparatus as claimed in claim 1, wherein the pickup portion of the conveyor is slightly inclined so that the animal's feet quickly lose contact with the ramp.

8. An apparatus as claimed in claim 1, wherein the conveyor has a plurality of flat cleats attached to it in an evenly spaced arrangement along its entire length, the cleats providing a frictional engagement with each animal supported on the conveyor thereby inhibiting the sliding movement of animals along the conveyor.

9. An apparatus as claimed in claim 8, wherein the cleats are rectangular rubber pads.

10. An apparatus as claimed in claim 1, wherein the means for introducing an anesthetizing gas into the chamber is a pipe extending into anesthetizing gas zone adjacent the bottom of the chamber.

11. An apparatus as claimed in claim 10, further comprising means for rapidly exhausting the anesthetizing gas from the chamber to prevent unwanted suffocation of animals in the anesthetizing gas zone.

12. An apparatus as claimed in claim 11, wherein the means for rapidly exhausting gas from the chamber is a blower connected to an exhaust pipe extending into the anesthetizing gas zone.

13. An apparatus as claimed in claim 1, wherein the conveyor has a variable speed drive means connected to a drive sprocket at the outlet end of the conveyor.

14. An apparatus as claimed in claim 1, wherein the guide means over the conveyor are a plurality of parallel spaced metal pipes, and the guide means along either side of the conveyor are walls.

15. An apparatus as claimed in claim 1, further comprising a plurality of anesthetizing gas sensors spaced along the anesthetizing gas zone to monitor the concentration of anesthetizing gas in the zone.

* * * * *